(12) United States Patent
Nonaka

(10) Patent No.: US 6,507,707 B2
(45) Date of Patent: Jan. 14, 2003

(54) DISTANCE MEASURING APPARATUS AND DISTANCE MEASURING METHOD

(75) Inventor: Osamu Nonaka, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/924,632

(22) Filed: Aug. 8, 2001

(65) Prior Publication Data

US 2002/0025152 A1 Feb. 28, 2002

(30) Foreign Application Priority Data

Aug. 24, 2000 (JP) ........................................ 2000-253922

(51) Int. Cl.7 ............................................... G03B 13/36
(52) U.S. Cl. ........................ 396/108; 396/104; 396/106; 396/123
(58) Field of Search ................................ 396/104, 106, 396/121, 122, 123, 98

(56) References Cited

U.S. PATENT DOCUMENTS 5,293,194 A  * 3/1994 Akashi ........................ 396/104

FOREIGN PATENT DOCUMENTS

| JP | 60-168111 | 8/1985 |
|---|---|---|
| JP | 03-153205 | 7/1991 |

* cited by examiner

Primary Examiner—W. B. Perkey
(74) Attorney, Agent, or Firm—Straub & Pokotylo; John C. Pokotylo

(57) ABSTRACT

Provided is a distance measuring apparatus that can cope with the problem of wrong distance measuring attributable to the presence of miscellaneous subjects and minimize the possibility of defocused photographing. In this distance measuring apparatus, passive-type distance measuring is carried out in accordance with a subject image signal for the central portion of a view field. Signal light for distance measuring from an infrared-emitting diode is projected on a subject in the central portion of the view field, and active-type distance measuring is carried out by means of a sensor array in accordance with reflected signal light reflected by the subject. According to the output result of the passive-type central distance measuring, a CPU determines whether or not to effect distance measuring for the peripheral portion of the view field based on an image signal for the peripheral portion.

7 Claims, 6 Drawing Sheets

DISTANCE MEASURING APPARATUS AND DISTANCE MEASURING METHOD

CROSS-REFERENCE TO RELATED APPLICATIONS

This application is based upon and claims the benefit of priority from the prior Japanese Patent Application No. 2000-253922, filed Aug. 24, 2000, the entire contents of which are incorporated herein by reference.

BACKGROUND OF THE INVENTION

1. Field of the Invention

The present invention relates to a distance measuring apparatus and a distance measuring method, and more specifically, to an improvement of auto-focusing technique for a camera.

2. Description of the Related Art

Broadly speaking, there are two known types of AF (auto-focusing) techniques. One is an active-type such that light from the camera side is projected on subjects to effect distance measuring, while the other is a passive-type that utilizes subject images for distance measuring.

There are commercially available cameras that can carry out distance measuring for subjects in the peripheral portion of the view field, as well as for subjects in the central portion of the view field. However, these cameras have a side effect that miscellaneous subjects, besides a main subject originally targeted by a photographer, can be focused owing to increased distance measuring points.

Described in Jpn. Pat. Appln. KOKAI Publication No. 60-168111 and the like, for example, is a technique that ensures successful photographing by combining the angle of photographic view of the camera and the range of distance measuring.

Despite the increased possible points for distance measuring, however, the information content for focusing is inevitably limited if the distance measuring points are restricted by the angle of photographic view only. If none of the results of distance measuring for selected distance measuring points are reliable, for example, the resulting picture may be entirely defocused in some cases.

BRIEF SUMMARY OF THE INVENTION

Accordingly, an object of the present invention is to provide a distance measuring apparatus and a distance measuring method that can cope with the problem of wrong distance measuring attributable to the presence of miscellaneous subjects and minimize the possibility of defocused photographing.

In order to achieve the above object, according to the present invention, there is provided a distance measuring apparatus comprising: first distance measuring means for effecting distance measuring in accordance with a subject image signal for the central portion of a view field; second distance measuring means for projecting distance measuring signal light on a subject in the central portion of the view field and effecting distance measuring in accordance with a reflection of the distance measuring signal light from the subject; third distance measuring means for effecting distance measuring in accordance with image signals for the peripheral portion of the view field; and decision means for determining whether or not to use the result of distance measuring obtained by means of the third distance measuring means, in accordance with the output results of the first and second distance measuring means.

According to the invention, moreover, there is provided a distance measuring apparatus comprising: a first sensor array located for distance measuring for the central portion of a view field and including a fixed-light eliminator; and a second sensor array located around the first sensor array and including no fixed-light eliminator.

According to the invention, furthermore, there is provided a distance measuring method comprising: a first step of executing active-type distance measuring operation and passive-type distance measuring operation for the central portion of a view filed; a second step of determining whether or not neither of the active- and passive-type distance measuring operations is executable for the central portion of the view filed; and a third step of executing the passive-type distance measuring operation for the peripheral portion of the view filed only if it is concluded in the second step that neither of the distance measuring operations is executable.

According to the invention, moreover, there is provided a distance measuring apparatus comprising: a first sensor array for detecting a subject image signal for the central portion of a view field; a projecting element for projecting light on a subject in the central portion of the view field through a projection optical system; a second sensor array for detecting subject images in the peripheral portion of the view field; an A/D converter for converting output signals from the first and second sensor arrays into digital values; and a CPU for settling the focus position of a photographic lens in accordance with the digital data converted by means of the A/D converter, the CPU being adapted to use the output of the second sensor array only if distance measuring cannot be effected with use of the output of the first sensor array, without regard to the execution of the projection by means of the projecting element.

According to the invention, furthermore, there is provided a distance measuring method comprising: a first step of executing photographing distance measuring for the central portion of a view filed; a second step of determining whether or not the reliability of the result of distance measuring obtained in the first step is low; a third step of using the result of distance measuring obtained in the first step if it is concluded in the second step that the reliability is high; a fourth step of executing active-type distance measuring for the central portion of the view field and passive-type distance measuring for the peripheral portion of the view filed if it is concluded in the second step that the reliability is low; and a fifth step of comparing two results of distance measuring obtained in the fourth step and using the result of distance measuring for the far side.

Since active-type AF utilizes a reflection of projected light, accurate distance measuring cannot be effected for subjects in the distance from which the projected light cannot return or low-reflectance subjects. However, it is an effective distance measuring system for noncontrastive subjects or dark scenes that cannot be favorably coped with by passive-type AF.

On the other hand, the passive-type AF is a distance measuring system that utilizes image signals of subjects. In this case, therefore, there is no possibility of lowering of accuracy attributable to the subject distance, which is involved in the active-type AF, although the accuracy can be changed by the contrast or brightness of subjects.

Accordingly, it has been attempted to develop cameras or other focusing apparatuses that can focus subjects without preference by combining the two distance measuring systems. However, no effective countermeasures are taken against awkward scenes for either of the two systems to deal with.

According to the present invention, distance measuring can be securely effected by combining the two systems for the main subject in the central portion that hardly allows the presence of miscellaneous subjects. For those scenes with which neither of the two distance measuring systems can deal well, on the other hand, photographing with less defocusing can be enjoyed also with reference to the other results of distance measuring than those of distance measuring for the central portion of the view field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIGS. 1A and 1B show a configuration of a camera according to a first embodiment of the present invention, in which FIG. 1A is an external perspective view, and FIG. 1B is a diagram showing the respective principal parts of an electrical system and an optical system;

DETAILED DESCRIPTION OF THE INVENTION

Preferred embodiments of the present invention will now be described with reference to the accompanying drawings.

Figure 4A:
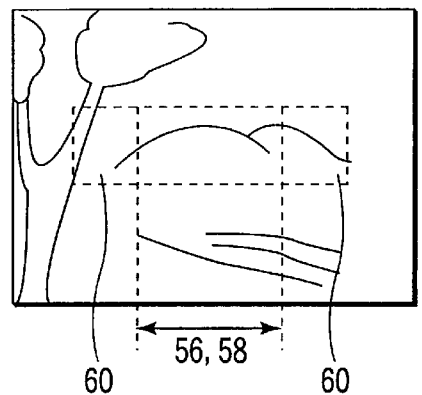
FIGS. 4A to 4C are diagrams illustrating scenes and distance measuring areas of the camera to which a distance measuring apparatus according to the invention is applied.

A scene shown in FIG. 4A, for example, is an awkward scene for an auto-focusing camera to deal with in distance measuring operation. This scene includes hazy gentle ranges or clouds alone in the central portion of a view field in which a subject exists with the highest probability. Since the contrast of this scene is so low that accurate distance measuring cannot be effected by passive-type AF. Since light for distance measuring never reaches the subject (ranges or clouds), on the other hand, correct distance measuring for the scene cannot be effected by active-type AF.

According to a first embodiment of the present invention, therefore, a distance measuring apparatus with the following configuration is applied to a camera so that a scene of the aforesaid kind can be photographed without being defocused.

Figure 1A:
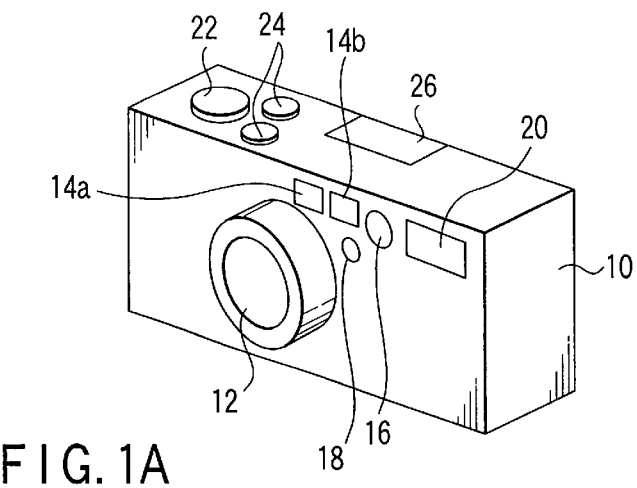
Figure 1B:
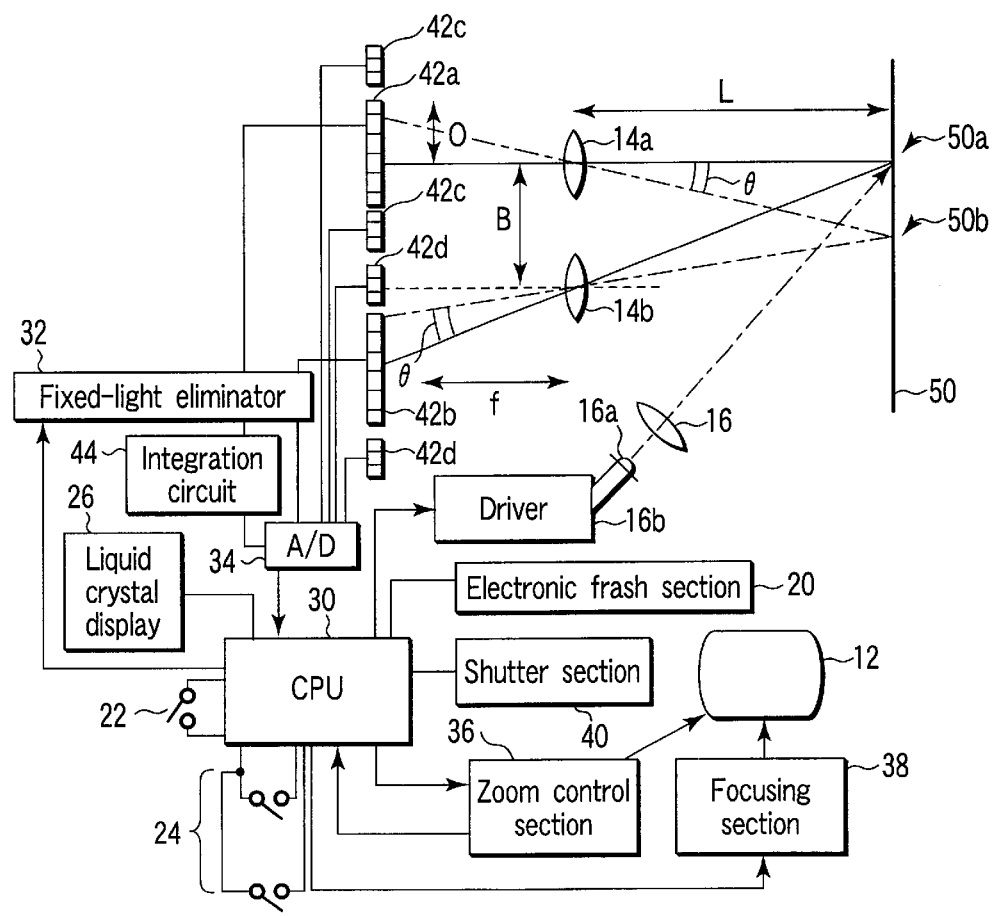

FIGS. 1A and 1B show a configuration of the camera according to the first embodiment of the invention. FIG. 1A is an external perspective view, and FIG. 1B is a diagram showing the respective principal parts of an electrical system and an optical system.

In FIG. 1A, a photographic lens 12 is located substantially in the center of the front portion of a camera body 10. Overlying the lens 12 on the front portion of the camera, photoreceptor lenses (windows) 14a and 14b for distance measuring, a projector lens (window) 16, etc. are arranged adjacent to a viewfinder objective lens 18. Further, an electronic flash element 20 is provided adjacent to the projector lens 16.

The top portion of the camera body 10 carries thereon a liquid crystal display (LCD) 26 for displaying the number of exposed frames, etc., as well as a release switch 22 for starting the photographing operation of the camera and a zoom switch 24 for controlling zooming.

In FIG. 1B, a CPU 30 for use as arithmetic and control means is connected with a driver 16b for driving an infrared-emitting diode (IRED) 16a, electronic flash section 20, release switch 22, zoom switch 24, liquid crystal display 26, fixed-light eliminator 32, A/D converter 34, zoom control section 36, focusing section 38, and shutter section 40.

The fixed-light eliminator 32 is connected with an integration circuit 44 as well as sensor arrays 42a and 42b. Further, the A/D converter 34 is connected with additional sensor sections 42c and 42d (mentioned later) as well as the integration circuit 44.

If the release switch 22 or the zoom switch 24 in this arrangement is operated, the CPU 30 detects this operation and causes the zoom control section 36 to change the focal length of the photographic lens 12. Thereupon, the angle of photographic view is changed, the focusing section 38 is controlled according to the results of distance measuring, or the shutter section 40 is controlled. Thus, the photographing sequence is subjected to centralized control.

Distance measuring means that is composed of the two photoreceptor sections (photoreceptor lenses for distance measuring) 14a and 14b serves to sense the distribution of light from a subject 50. Light from a position 50a on a full-line light beam that passes through the optical axis of photoreceptor lens 14a is received also by means of the photoreceptor lens 14b that is located at a distance equal to a base length B from the photoreceptor lens 14a. The light beams transmitted through the two lenses 14a and 14b are landed on the sensor arrays 42a and 42b, respectively. If the respective outputs of sensors can be examined, the light intensity distribution can be obtained in the form of image signals.

If the focal length of the photoreceptor lenses 14a and 14b is f, light from the position 50a of the subject that is directed toward the sensor array 42b through the photoreceptor lens 14b lands on a position corresponding to a distance x from the optical axis. Based on the value x and a relation B f between the base length B and the focal length f, a subject distance L is given by L=B·f/x.

To obtain the value x, the image signals for the two sensor arrays must be judged correctly. The respective outputs of the sensors that constitute the sensor arrays are A/D-converted by means of the A/D converter 34. In the CPU 30, image signals obtained from the output of the A/D converter 34 are compared, whereupon the value x is obtained.

For a subject with no or very low contrast, light from the IRED 16a is pulsatively projected through the projector lens 16 by means of the driver 16b in order to formed light distribution.

In order to enhance the effect of the infrared projection, moreover, the fixed-light eliminator 32 is provided so that light components that are steadily applied to the subject can be removed and that only the aforesaid pulsed light components can be fetched. Further, the sensor arrays 42a and 42b can effect distance measuring in a manner such that the image position to be detected is changed from the position 50a to a position 50b by only shifting the monitored sensor position.

More specifically, the CPU 30 changes a reference image for distance measuring from an image on the optical axis of the photoreceptor lens 14a over to an image in a shifted position 51 at a distance O from the optical axis. As this is done, subjects that exist in adjacent regions 58, as well as ones that exist in a central region 56 in a view field 54W (or 54T) on the wide-angle side (or on the telephoto side), can be subjected to distance measuring, as shown in FIG. 2.

Further, the additional sensor elements 42c and 42d that enable distance measuring for the whole area covering the peripheral portion of the view field are arranged outside the sensor arrays 42a and 42b, respectively. Thus, subjects that exist in peripheral distance measuring areas 60 of FIG. 2 can be also subjected to distance measuring. Since these areas can be extended to the margin or outside of the view field by zooming out the photographic lens 12, however, distance measuring data for these areas are not used for a normal scene.

Figure 2:
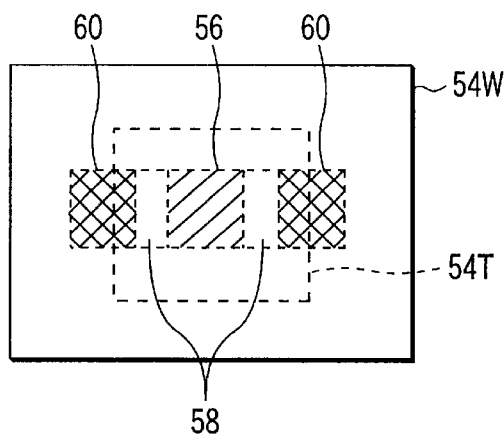
FIG. 2 is a diagram illustrating distance measuring areas according to the first embodiment.

According to the present embodiment, the peripheral distance measuring areas 60 are used only for a scene that cannot be subjected to either distance measuring (passive-type) based on the image signals in the respective distance measuring areas of the central region 56 and the adjacent regions 58 in the view field or distance measuring (active-type) based on light projection, as shown in FIG. 2.

Figure 3:
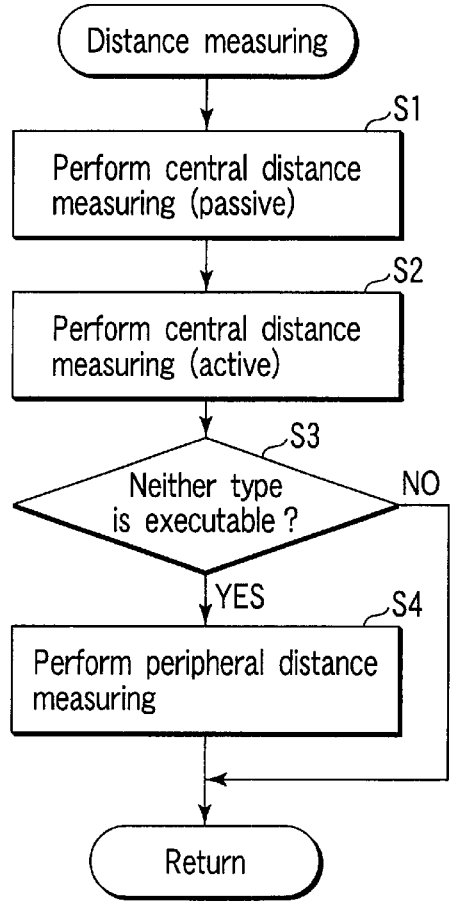
FIG. 3 is a flowchart illustrating distance measuring operation according to the first embodiment.

FIG. 3 is a flowchart for illustrating the distance measuring operation of the camera according to the first embodiment.

First, in Step S1, the passive-type distance measuring based on the image signals is carried out for the respective distance measuring areas of the central region 56 and the adjacent regions 58 in the view field. Then, in Step S2, the active-type distance measuring based on the light projection is carried out for the central distance measuring area.

In Step S3, whether or not neither the passive-type distance measuring of Step S1 nor the active-type distance measuring of Step S2 can be effected is determined. Only if it is concluded that neither can be effected, the program advances to Step S4, whereupon distance measuring is carried out for the peripheral distance measuring areas 60. If it is concluded in Step S3 that the distance measuring of one of the two types is possible, on the other hand, the present routine is finished without the execution of Step S4.

Thus, in the case of the scene shown in FIG. 4A, an area (peripheral distance measuring area 60) corresponding to a three on the left-hand end portion of the view field is focused lest the resulting photograph be an entirely defocused attempt.

Figure 4B:
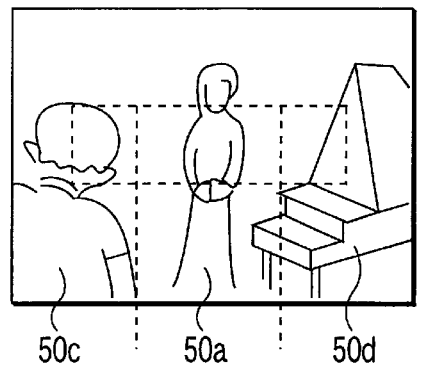

Conventionally, there has been known a method in which the distance measuring region is widened if satisfactory image signals cannot be obtained for distance measuring for the central portion of the view field. If clothes on a person 50a in the central portion of a scene such as the one shown in FIG. 4B are in low contrast, according to this method in which the distance measuring region is simply widened, however, a back-view person 50c, one of miscellaneous subjects, in the peripheral portion of the view field may possibly be focused, resulting in a failure.

According to the first embodiment described above, on the other hand, the active-type distance measuring is effected for the center of the view field. In the case of the scene shown in FIG. 4B, therefore, the person 50a exiting in the center can be focused in a manner such that reflected light from the person 50a is detected for distance measuring.

The following is a description of a second embodiment of the invention.

The fundamental configuration of a camera according to the second embodiment resembles that of the camera of the first embodiment shown in FIGS. 1A and 1B.

Figure 5:
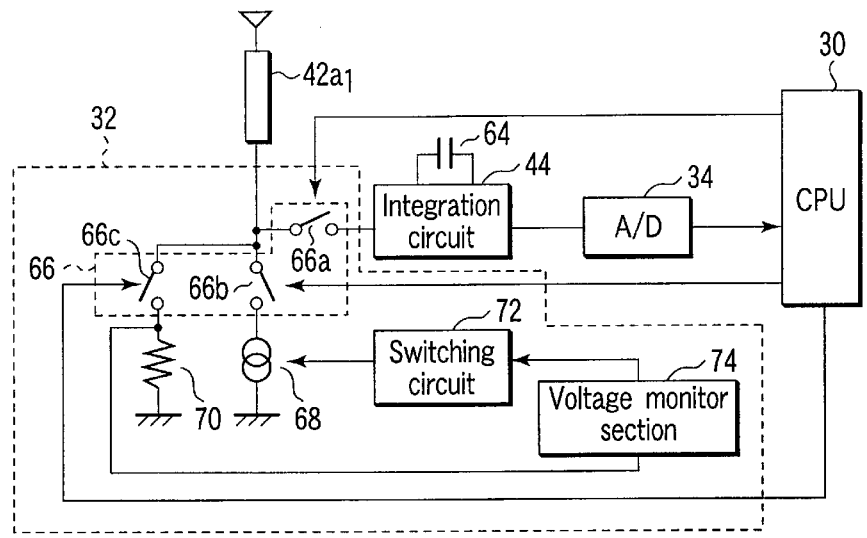
FIG. 5 is a diagram showing a configuration of a camera according to a second embodiment of the invention, including a fixed-light eliminator and its surroundings.

In the following, therefore, an active-type AF mode according to the second embodiment will be described in detail with reference to the block diagram of FIG. 5 and the timing charts of FIGS. 6A and 6B.

The fixed-light eliminator 32 is connected to the A/D converter 34 through the integration circuit 44 that includes an integration capacitor 64, and is also connected to the CPU 30. Further, the eliminator 32 comprises a switch group 66 including a plurality of switches 66a, 66b and 66c, current source 68, resistor 70 for voltage conversion, switching circuit 72, and voltage monitor element 74. A sensor $42a_1$ is one of the sensors that constitute the sensor array 42a.

In the sensor $42a_1$, light incident upon a photodiode structure is converted into photocurrent. By operating the switches 66a, 66b and 66c of the switch group 66, therefore, the output photocurrent is caused to flow into the integration circuit 44 to be integrated therein or flow into the resistor 70 for voltage conversion.

If the switches 66a and 66b are first turned off with only the switch 66c on, photocurrent corresponding to the quantity of light incident upon the sensor flows through the resistor 70 and is converted into voltage. The converted voltage is monitored by means of the voltage monitor element 74. Based on the result of the monitoring, the switching circuit 72 is controlled, and the current source 68 is switched (fixed light detection of FIG. 6A).

If the same current that flows through the resistor 70 is made to flow into the current source 68 by this action, the switches 66b and 66a are turned on, while the switch 66c is turned off. Thereupon, the photocurrent ceases to flow into the integration circuit 44.

If distance measuring light is projected in this state (reflected light quantity integration section of FIG. 6A), the light components (fixed light components) having been incident before light emission are removed by means of the current source 68, and only the reflected signal components of the projected light are integrated. If the resulting integral value is read in the A/D conversion section of FIG. 6A by means of the CPU 30, image signals for distance measuring can be obtained even for a subject without or with no or very low contrast, in accordance with the shape of spots of the projected light on the subject. Since the quantity of reflected signal light is reduced in inverse proportion to the reciprocal of the subject distance L, moreover, distance measuring can be also effected in accordance with the quantity of light.

Figure 6A:
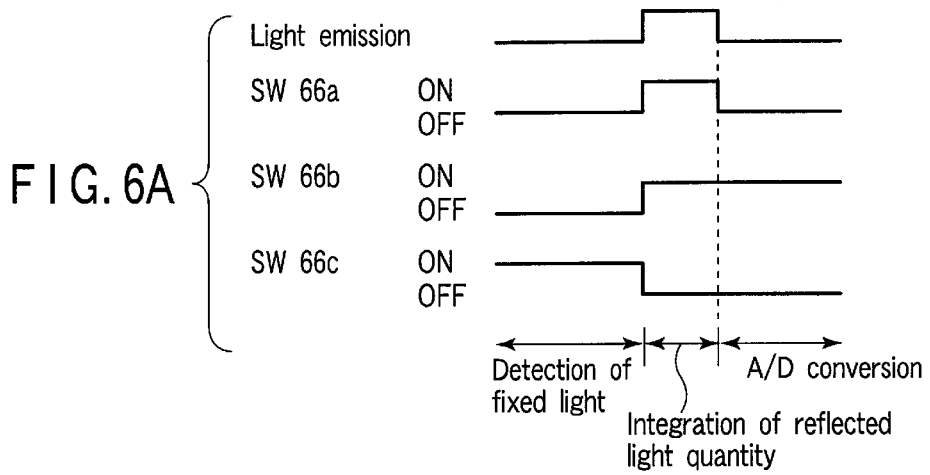
FIGS. 6A and 6B are timing charts illustrating the operation of the camera according to the second embodiment.
Figure 6B:
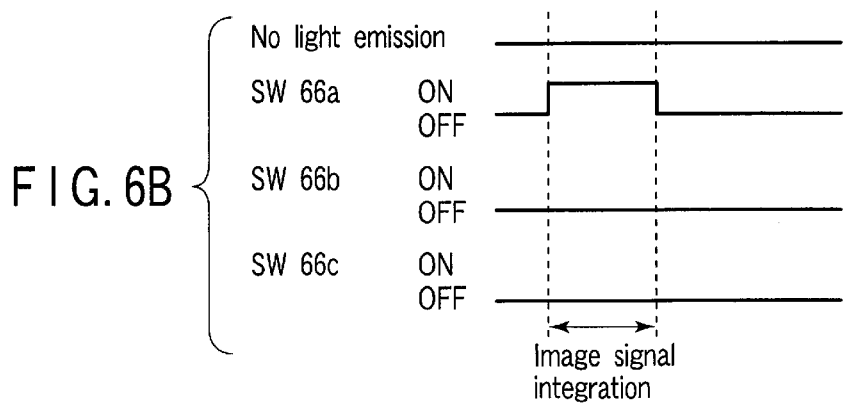

In the case of the normal passive-type distance measuring, on the other hand, no light is emitted from the projection light source, as shown in the timing chart of FIG. 6B. In this case, the switch 66a should be turned on with the other switches 66b and 66c kept off so that the photocurrent delivered from the sensor $42a_1$ can be applied to the integration circuit 44 for a given period of time.

Thus, the integration level of the output of the sensor for monitoring bright portions becomes higher, while that of the output of the sensor for monitoring dark portions lowers. The changes of the integration levels generate contrasts that form the image signals for distance measuring.

Thus, by properly using the switch control based on the timing charts of FIGS. 6A and 6B, the camera shown in FIGS. 1A and 1B can carry out distance measuring in either of the passive—and active-type AF modes. In the fixed-light eliminator 32, however, each of the sensors that constitute each array must be provided with the circuit with each of the aforesaid functions, so that a large-scale circuit configuration is required. According to the first embodiment, therefore, the additional sensor elements 42c and 42d are not provided with any fixed-light eliminator.

It is hard to apply light with high contrast to wide zones in the view field. In the case of the scene of FIG. 4A, for example, it is technically difficult to effect distance measuring in the active-type AF mode for the regions of the peripheral distance measuring areas 60, on both the projection and reception sides.

Based on this arrangement, operation for correct distance measuring for a scene shown in FIG. 4C will now be described with reference to the flowchart of FIG. 7.

Figure 4C:
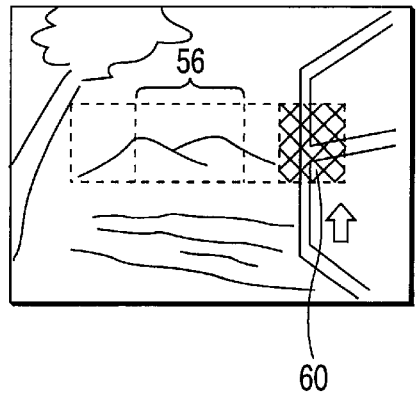

In this second embodiment, a window frame in the scene shown in FIG. 4C and the person 50c in the scene shown in FIG. 4B are defocused with reference to the result of active-type distance measuring for the central portion.

First, in Step S11, an object existing in the central portion of a view field is subjected to the passive-type distance measuring (perform central distance measuring). Then, in Step S12, the result of distance measuring obtained in Step S11 is judged. If it is concluded that the reliability the obtained result of distance measuring is low because the subject images are too dark or noncontrastive, the program advances to Step S13. If it is concluded that the reliability is high enough, the program advances to Step S21.

In Step S13, distance measuring light is projected on the central portion of the view field, and a reflected signal light quantity $P_o$ is detected. Then, the light quantity $P_o$ and a given quantity $P_N$ are compared in Step S14. If it is concluded that the light quantity $P_o$ is larger than the given quantity $P_N$, the program advances to Step S15.

In Step S15, a distance $L_c$ in the central portion is calculated according to the reflected signal light quantity $P_o$. This calculation is based on the principle that the reflected signal light quantity is reduced in inverse proportion to the square of the distance. In this case, a constant A shown in the flowchart is a value equal to the square of the quantity of signal light that returns from a subject at a distance of 1 m.

If it is concluded in Step S14 that the light quantity $P_o$ is smaller than the given quantity $P_N$, on the other hand, the program advances to Step S16. This indicates that the quantity of light returned from the subject is concluded to be insufficient for distance measuring. In this case, therefore, the longest reach (e.g., 10 m) is regarded as the comparative distance $L_c$ in Step S16.

Then, in Step S17, the passive-type distance measuring is carried out for the peripheral portion (corresponding to the peripheral areas 60 of FIG. 4C) of the view field that is narrowly covered by the angle of view. In Step S18, next step, a distance Le then obtained is compared with the distance $L_c$ in the central portion as the result of the aforementioned active-type AF for the central portion.

If it is concluded in Step S18 that the distance $L_c$ is longer than the distance $_e$, shorter distances are not used, and the program advances to Step S19. Thereupon, the distance $L_c$ that is obtained in the central distance measuring operation is regarded as a focusing distance $L_p$. Only in the case where the distance $L_e$ is equal to or longer than the distance $L_c$, on the other hand, the program advances to Step S20, whereupon the distance $L_e$ is used as the focusing distance $L_p$.

In Step S20, focusing is effected for the distance $L_p$ obtained in this manner. In the case of the scene shown in FIG. 4C, the window frame is situated at a distance obviously shorter than the result of the central active-type distance measuring. Also in the case of the scene shown in FIG. 4B, the output distance for the person 50c is obviously shorter than the distance that is detected from reflected light from the person 50a in the center. However, the window fame and the person 50c are not focused, so that an attempt of the picture can be prevented. In the case of the scene of FIG. 4B, moreover, a piano 50d in the same peripheral portion and at the same distance with the person 50a is focused.

Thus, according to the second embodiment, the distance measuring is repeated for a wider region. In the case of the scene shown in FIG. 4C in which the window frame appears on the view field, however, the window frame cannot be focused.

In the case of the scene shown in FIG. 4B in which the person in the center is so far that the contrast is low, moreover, the widened distance measuring region cannot cause the back-view person 50c to be focused.

According to the second embodiment, as described above, objects in the central portion of the view field can be securely subjected to distance measuring without being influenced by peripheral miscellaneous subjects, and successful photographing can be enjoyed even though the subjects in the central portion of the view field are awkward ones for the camera to deal with.

Figure 8A:
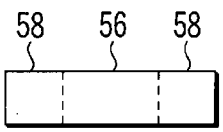
FIGS. 8A to 8C are diagrams showing transitions of distance measuring areas according to the second embodiment.
Figure 8B:
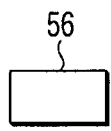
Figure 8C:
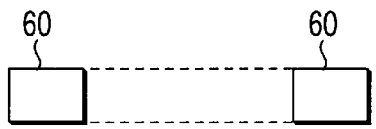

FIGS. 8A to 8C are diagrams showing transitions of distance measuring areas.

Figure 7:
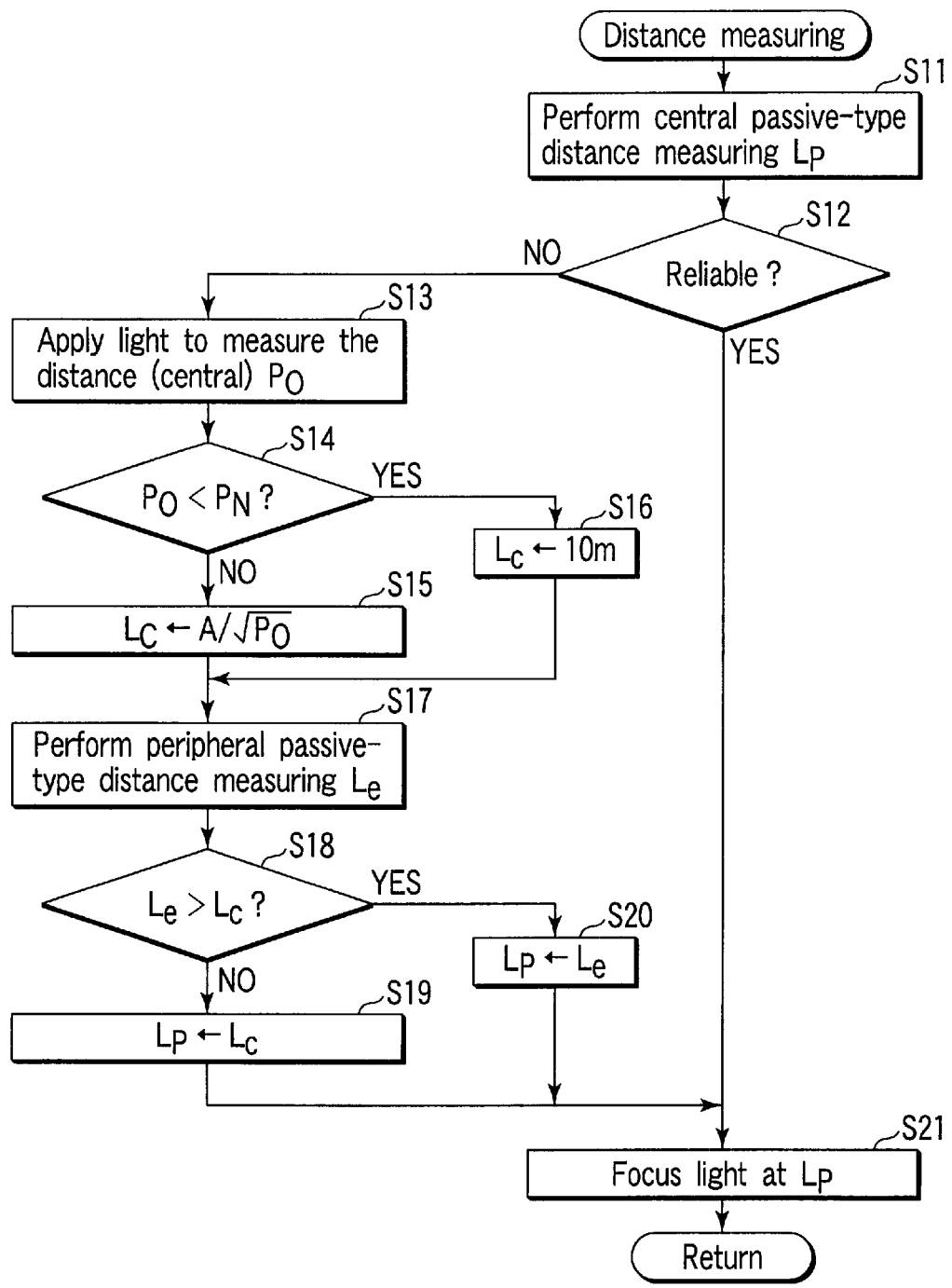
FIG. 7 is a flowchart illustrating distance measuring operation of the camera according to the second embodiment.

Distance measuring areas 56 and 58 shown in FIG. 8A are obtained by the central passive-type distance measuring of Step S11 in the flowchart of FIG. 7. Further, the distance measuring area 56 shown in FIG. 8B is obtained by the central active-type AF of Step S13. Furthermore, distance measuring areas 60 shown in FIG. 8C is obtained by the peripheral passive-type distance measuring of Step S17.

The distance measuring areas 56, 58 and 60 do not represent a distance measuring point each, and each sensor array may be divided into several parts for distance measuring.

The following is a description of a third embodiment of the invention.

Figure 9:
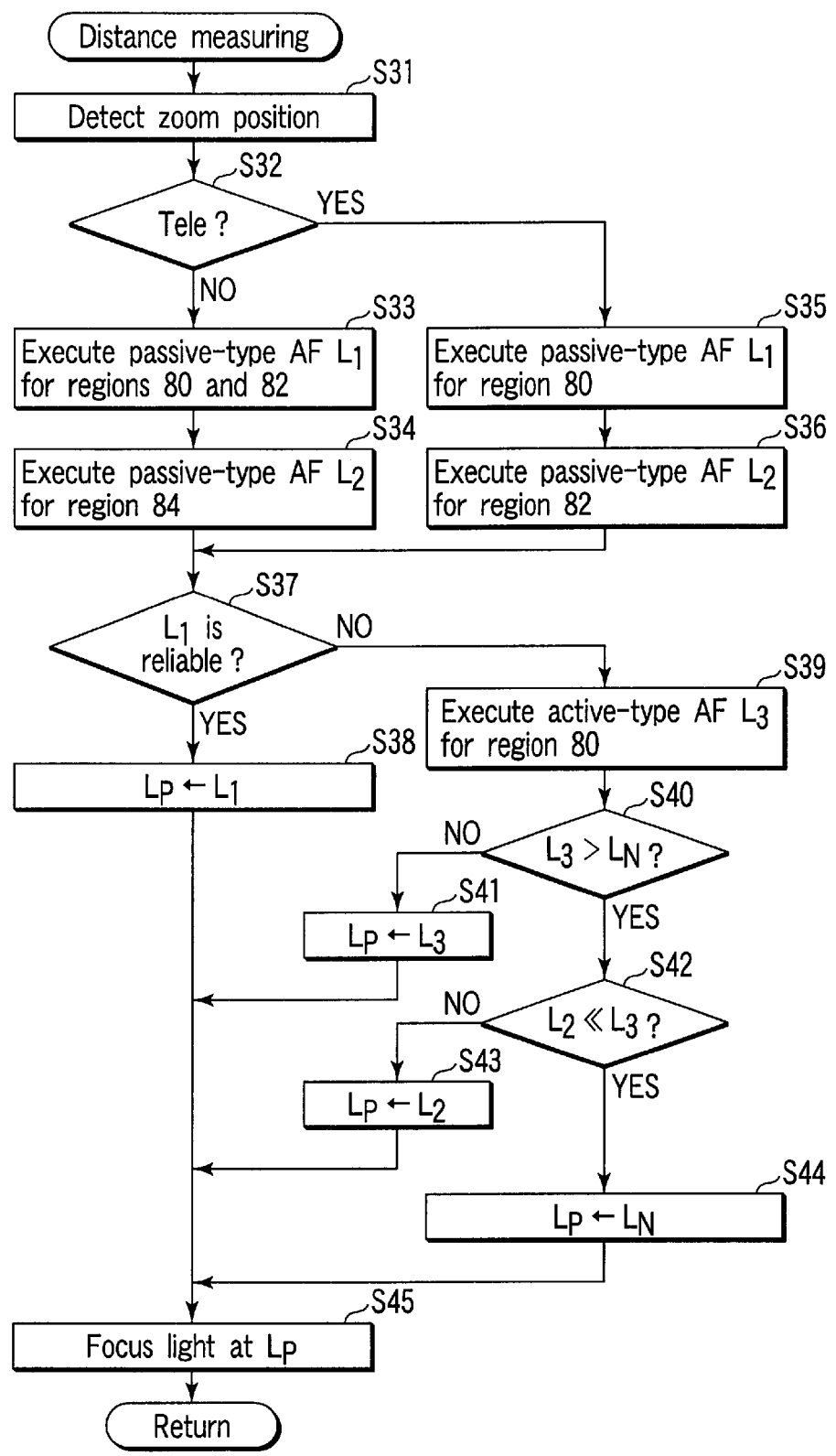
FIG. 9 is a flowchart illustrating distance measuring operation following change of the angle of view of the view field, using a camera according to a third embodiment of the invention.

An example of distance measuring that follows change of the angle of view of a view field will now be described with reference to the flowchart of FIG. 9.

According to the third embodiment, the angle of view changes between the wide-angle side (54W) and the telephoto side (54T), and distance measuring areas that are arranged two-dimensionally change.

Figure 10:
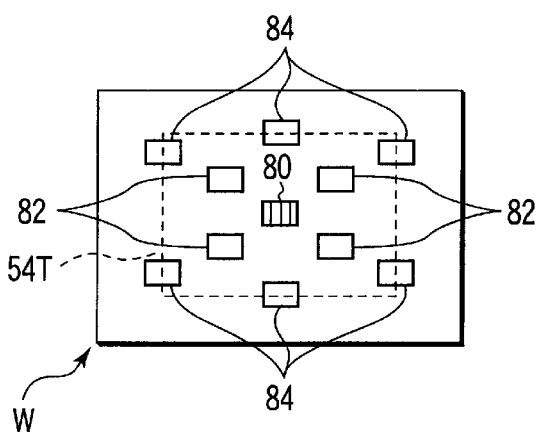
FIG. 10 is a diagram showing the relation between the view field and distance measuring regions.

More specifically, distance measuring can be effected for many points in the view field. As shown in FIG. 10, for example, regions 84 that are narrowly covered by the angle of view (54T) for telephotographing cannot be photographed even if objects of distance measuring exist in them. In many cases, moreover, miscellaneous subjects exist in the peripheral portion of the view field. If distance measuring is executed for these miscellaneous subjects, a main subject in the central portion may possibly be defocused. Accordingly, the miscellaneous subjects are excluded from objects of distance measuring.

First, in Step S31, a zoom position is detected during focusing operation in order to examine the angle of view for photographing. Then, whether the detected zoom position is on the telephoto side or on the wide-angle side is determined in Step S32. Based on the result of decision, the distance measuring points are switched for passive-type distance measuring.

If it is concluded that the zoom position is on the wide-angle side, the program advances to Step S33. The results of distance measuring obtained from a region 80 in the central portion of the view field and a plurality of regions 82 around it as prevailing distance measuring points are designated collectively by $L_1$. In Step S34, next step, a plurality of regions 84 around the regions 82 are subjected to distance measuring ($L_2$).

If it is concluded in Step S32 that the zoom position is on the telephoto side, on the other hand, the program advances to Steps S35 and S36, whereupon the same passive-type distance measuring of Steps S33 and S34 for the wide-angle side is carried out. Thus, the results $L_1$ and $L_2$ of distance measuring for the regions 80 and 82 are obtained in Steps S35 and 36, respectively.

Symbol $L_1$ designates high-priority results of distance measuring, and $L_2$ designates results with lower priority.

In Step S37, thereafter, the high-priority results $L_1$ of distance measuring are checked for reliability. If it is concluded that the reliability is high enough, the program advances to Step S38, whereupon the focusing distance $L_p$ is selected from the series of results $L_1$ of distance measuring. Thereafter, the program advances to Step S45, whereupon focusing is carried out.

If it is concluded in Step S37 that the reliability of $L_1$ is low, however, the program advances to Step S39. Thereupon, light is projected on the central portion of the view field and active-type distance measuring is carried out, and results $L_3$ are obtained. Since the reliability of the results $L_3$ of active-type AF for long distances is poorer, the results $L_3$ are compared in Step S40 with a given long distance $L_N$ at which the reliability lowers. If it is concluded that the results $L_3$ are distances shorter than the given long distance $L_N$, the program advances to Step S41, whereupon the results $L_3$ are regarded as results of distance measuring for focusing.

Thereafter, the program advances to Step S45.

If it is concluded in Step S40 that the distances $L_3$ are longer than the given long distance $L_N$, on the other hand, focusing can be carried out with higher reliability by utilizing the previous results of distance measuring for the peripheral portion. Thus, the program advances to Step S42, whereupon the results $L_2$ of passive-type distance measuring for the peripheral portion and the results $L_3$ of active-type distance measuring are compared.

If it is concluded that the distances $L_2$ are not much shorter than the distances $L_3$, the possibility of objects that are subjected to distance measuring at the distances $L_3$ being miscellaneous subjects such as the window frame of FIG. 4C can be supposed to be low.

Thus, the program advances to Step S43, whereupon the results $L_2$ are used as focusing distances.

If it is concluded in Step S42 that the distances $L_2$ as the results of passive-type distance measuring for the peripheral portion are much shorter than the distances $L_3$ as the results of active-type distance measuring, objects at the distances $L_2$ can be supported to be miscellaneous subjects, and the longest distance $L_N$ for active-type AF is regarded as the focusing distance. In this case, the program advances to Step S44, whereupon focusing is carried out with the distance $L_N$ used as the focusing distance.

In Step S45, thereafter, the focusing of distance $L_p$ is selected from the series of results of distance measuring.

According to the third embodiment, as described above, a high-priority distance measuring region is settled according to the angle of view for photographing, and is focused in comparison with peripheral distance measuring regions. Accordingly, there may be provided a camera that can correctly focus a main subject as it photographs.

Figure 11:
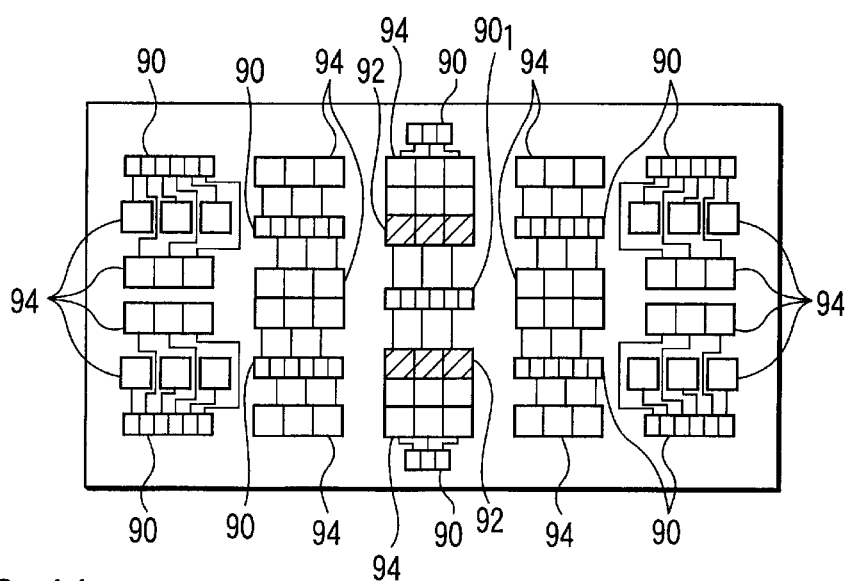
FIG. 11 is a diagram showing a configuration of components on an IC of a light sensor applicable to the invention.

FIG. 11 is a diagram showing a configuration of components on an IC of a light sensor that is applicable to the present invention.

As mentioned before, the fixed-light eliminator and the circuits for integration and A/D conversion must be arranged on the same chip with the sensor. If each of the sensor arrays is provided with the fixed-light eliminator, however, the eliminators occupy a wide area, so that the space for the sensor arrays is reduced. Thus, the distance measuring points are lessened.

According to the embodiment described above, therefore, fixed-light eliminators 92 and circuits 94 for integration and A/D conversion are arranged corresponding to active-type AF only in a sensor array $91_1$ for distance measuring for the central portion of the view field. Each peripheral sensor array 90 is provided with circuits 94 for integration and A/D conversion, and is not with a fixed-light eliminator. Thus, the distance measuring points are increased in a manner such that the peripheral sensor arrays are arranged utilizing the remaining areas other than the area for the sensor array for central distance measuring and the accompanying circuits.

In this manner, the IC area can be lessened to facilitate reduction in cost and space.

According to the present invention, as described above, there may be provided a distance measuring apparatus that can cope with the problem of wrong distance measuring attributable to the presence of miscellaneous subjects and minimize the possibility of defocused photographing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claim s and their equivalents.

What is claimed is:

1. A distance measuring apparatus comprising:
   first distance measuring means for effecting distance measuring in accordance with a subject image signal for the central portion of a view field;

second distance measuring means for projecting distance measuring signal light on a subject in the central portion of the view field and effecting distance measuring in accordance with a reflection of the distance measuring signal light from the subject;

third distance measuring means for effecting distance measuring in accordance with image signals for the peripheral portion of the view field; and decision means for determining whether or not to use the result of distance measuring obtained by means of the third distance measuring means, in accordance with the output results of the first and second distance measuring means, wherein said decision means compares the reach of the projected distance measuring signal light and the result of distance measuring obtained by means of the third distance measuring means, and determines whether or not to use the result obtained by means of the third distance measuring means, in accordance with the result of the comparison.

2. A distance measuring apparatus comprising:

a first sensor array located for distance measuring for the central portion of a view field and including a fixed-light eliminator; and a second sensor array located around the first sensor array and including no fixed-light eliminator.

3. A distance measuring apparatus according to claim 2, wherein said second sensor array is located adjacent to the fixed-light eliminator.

4. A distance measuring method comprising:

a first step of executing active-type distance measuring operation and passive-type distance measuring operation for the central portion of a view field;

a second step o f determining whether or not neither of the active—and passive-type distance measuring operations is executable for the central portion of the view field; and a third step of executing the passive-type distance measuring operation for the peripheral portion of the view field only if it is concluded in the second step that neither of the distance measuring operations is executable.

5. A distance measuring apparatus comprising:

a first sensor array for detecting a subject image signal for the central portion of a view field;

a projecting element for projecting light on a subject in the central portion of the view field through a projection optical system;

a second sensor array for detecting subject images in the peripheral portion of the view field;

an A/D converter for converting output signals from the first and second sensor arrays into digital values; and a CPU for settling the focus position of a photographic lens in accordance with the digital data converted by means of the A/D converter, the CPU being adapted to use the output of the second sensor array only if distance measuring cannot be effected with use of the output of the first sensor array, without regard to the execution of the projection by means of the projecting element.

6. A distance measuring apparatus according to claim 5, further comprising a circuit connected between the first sensor array and the A/D converter and used to eliminate fixed light components incident upon the first sensor array.

7. A distance measuring method comprising:

a first step of executing photographing distance measuring for the central portion of a view field;

a second step of determining whether or not the reliability of the result of distance measuring obtained in the first step is low;

a third step of using the result of distance measuring obtained in the first step if it is concluded in the second step that the reliability is high;

a fourth step of executing active-type distance measuring for the central portion of the view field and passive-type distance measuring for the peripheral portion of the view field if it is concluded in the second step that the reliability is low; and a fifth step of comparing two results of distance measuring obtained in the fourth step and using the result of distance measuring for the far side.

* * * * *